United States Patent [19]

Korinek et al.

[11] 4,330,386

[45] May 18, 1982

[54] COMBINED ION-EXCHANGE PARTICULATE BED ELECTROLYTIC CELL

[75] Inventors: K. A. Korinek, Mentor, Ohio; R. E. Anderson, Sunnyvale, Calif.; M. G. Konicek, Brecksville, Ohio

[73] Assignee: Diamond Shamrock Corporation, Dallas, Tex.

[21] Appl. No.: 222,275

[22] Filed: Dec. 31, 1980

[51] Int. Cl.³ .......................... C25C 7/00; C25C 7/02
[52] U.S. Cl. ............................... 204/223; 204/222; 204/232; 204/237; 204/180 B
[58] Field of Search ............................... 210/663, 670; 204/180 B, 130, 232, 237, 106–108, 112–119, 105 R, 222, 223, 228

[56] References Cited

U.S. PATENT DOCUMENTS

| | | | |
|---|---|---|---|
| 2,793,183 | 5/1957 | Thurman | 204/180 B |
| 3,547,810 | 12/1970 | Cooper | 210/663 |
| 3,788,960 | 1/1974 | Patil et al. | 204/180 B |
| 3,919,062 | 11/1975 | Lundquist et al. | 204/130 |
| 3,974,049 | 8/1976 | James et al. | 204/222 |

FOREIGN PATENT DOCUMENTS

| | | | |
|---|---|---|---|
| 47-18763 | 5/1972 | Japan | 210/669 |
| 901572 | 7/1962 | United Kingdom | 204/180 B |

Primary Examiner—R. L. Andrews
Attorney, Agent, or Firm—John P. Hazzard; Woodrow W. Ban

[57] ABSTRACT

A method and apparatus for reducing electrowinnable metal ion concentration to a low level in a process stream and recovering the metal electrolytically. Low concentration metal ions from the process stream are recovered in an ion exchanger and then recaptured from the ion exchanger into a relatively small volume of regeneration fluid. The regeneration fluid, pregnant with the metal ions, is electrolyzed in a particulate bed electrolytic cell to a relatively low level of metal ion concentration, and the regeneration fluid is then available for reuse in a further ion exchanger regeneration.

2 Claims, 2 Drawing Figures

COMBINED ION-EXCHANGE PARTICULATE BED ELECTROLYTIC CELL

FIELD OF THE INVENTION

This invention relates to methods and apparatus for the recovery of metals from solutions containing ions of the metals. More specifically this invention relates to a method and apparatus for essentially complete removal of those dissolved metal ions from solutions containing relatively dilute quantities of the metal ions and for concentration and subsequent electrolytic recovery of those metal ions.

BACKGROUND OF THE INVENTION

Certain industrial processes utilize, in their workings, solutions containing ions of metals. A broad spectrum of metals are included in various solutions for use in a wide variety of processes. At some point in many industrial processes utilizing metal ion-containing solutions, it has been necessary to remove metal ions from the process streams. From time to time, these streams are so-called spent process, purge or waste streams discarded while generally including a quantity of the metal ions. Where the spent process streams have been discarded, these metal ions have been thereby unrecoverably lost. Yet, for some process streams containing somewhat elevated metal ion quantities, continued use of the stream within the process may be imperiled by the presence of the metal ions. In the past, these metal ions discarded from the process or contained in unrecycleable spent process streams have represented, depending upon the metal, a potential health or environmental problem. Where the metal ions have had significant value, such as gold, silver, copper, and nickel, unrecoverable metal ions in these process streams also have represented a considerable economic loss.

Often other chemicals in these process streams would have continued usefulness in the industrial process and could be recycled but for the presence of the metal ions. Where otherwise useful process chemicals are discarded due to metal ion content, the economic and environmental cost of discarding these chemicals compound losses associated with simple discarding of the metal ions.

Over the years, economic and social costs associated with unrecoverable metal losses in the handling of process streams has stimulated a variety of proposals for their recovery. Where concentration of electrowinnable metal ions in a process stream is in excess of about 10 grams per liter, it has been found that the process stream can be electrolyzed efficiently to recover the metal. A substantial portion of metals contained in such process streams has been thereby recovered. Considerable difficulty has been encountered in reducing efficiently the metal ion concentration in a typical process stream below about one gram metal per liter utilizing only simple electrolytic cell treatment, particularly where the fluid stream is relatively nonelectrically conductive. Therefore, depending upon the volume and initial metal ion concentration of the process stream, electrowinnable metal remaining in many process stream applications has remained considerable even after electrowinning treatment.

Where it is desired that residual metal ion concentrations in a process stream be reduced substantially below one gram per liter, a large number of procedures have been proposed wherein the metal ions are caused to react with a chemical to produce a salt of the metal ion which precipitates from the metal ion-containing process stream. Significant problems have been encountered with this approach including: costs associated with the precipitation chemicals; difficulty in recovering the metal from the precipitated salts; the potentially dangerous nature of reactants used to precipitate the metal ions; toxicity and other problems with the precipitate; and in some cases, difficulties disposing of potentially objectionable new ions introduced into the process stream by the chemical reaction.

Removal of metal ions from fluid streams utilizing an ion exchange resin is known. Problems with ion exchange recovery have included difficulty in recovering a considerable portion of the metal ions from a fluid used to regenerate the resin and difficulties in efficiently rendering the regeneration fluid suitable, i.e., sufficiently low in concentration of the metal ion to enable reuse in further resin regeneration.

More recently a particular type of electrolytic cell has been developed, one in which small particles circulate within en electrolyte stream flowing in a zone between an anode and a cathode current feeder. The particles occasionally contact the cathode current feeder and function as the cathode in the electrolytic cell. These so-called particulate bed electrolytic cells (PBC) have been found capable of efficiently removing metal ions from a fluid stream containing metal ions in an initial concentration of about one gram per liter to a concentration as low as about 50 parts per million (ppm). When attempting to achieve a final concentration of 50 ppm or less, these PBCs have been found to operate somewhat inefficiently on streams having an initial metal ion concentration significantly below one gram per liter. PBC operation in a process stream to a very low residual metal ion concentration, for example, less than 50 ppm, contributes to reduced electrical current efficiency of the PBC in overall recovery of the metal ions. Therefore PBCs have not provided a wholly satisfactory route to achieving a final metal ion concentration approaching one ppm in a process fluid, particularly in situations where the initial metal ion concentration in the process fluid is significantly below one gram per liter or where electrical conductivity of the fluid stream is low.

Heretofore, reasonably efficient electrolytic recovery to a residual metal ion concentration significantly below 50 ppm in a purge stream of significant volume has not generally been practical using electrolytic techniques.

DISCLOSURE OF THE INVENTION

The present invention provides an improved method and apparatus for (a) removing dilute quantities of metal ions from a fluid stream to a concentration that can approach one part per million (ppm); (b) concentrating the metal ions in a second fluid, and (c) recovering the metal ions from the second fluid to a metal concentration sufficiently dilute to enable reuse of the second fluid in concentrating further metal ions.

A treatment device made in accordance with this invention includes an ion exchanger and a particulate bed electrolytic cell (PBC). The container-like ion exchanger is charged with a predetermined quantity of an ion exchange resin. The fluid, containing ions of the metal to be recovered, is accumulated in a fluid circulation system. Using the fluid circulation system, this fluid is passed through the porous, particulate mass of ion exchange resin within the ion exchanger. There the metal ion-containing fluid contacts the ion exchange resin, and the metal ions are removed and retained upon the resin either by direct ion exchange or by adsorption into the resin structure. When a desired quantity of the metal ions have been retained upon the resin, fluid flow through the ion exchanger is discontinued in preparation for regenerating the ion exchange resin. Regeneration is accomplished by removing the retained metal ions. In treatment process configurations wherein significant amounts of fluid remain within the ion exchanger after fluid flow is discontinued, displacement of this fluid may be effected.

The metal ions are removed from the ion exchange resin utilizing a second or regeneration fluid. The quantity of regeneration fluid employed to regenerate the resin is considerably smaller than the volume of metal ion-containing fluid originally contacted with the resin. Removal of the metal ions retained upon the resin utilizing this relatively small volume of regeneration fluid effectively concentrates the metal ions in the regeneration fluid to a concentration level considerably greater than in the fluid from which the metal ionas were removed. This greater metal ion concentration facilitates subsequent recovery of the metal ions in the particulate bed electrolytic cell.

The regeneration fluid is accumulated in a regeneration fluid handling system. This regeneration fluid handling system is employed to pass the regeneration fluid through the ion exchange column where the regeneration fluid contacts the resin, removing metal ions retained on the resin by either reverse ion exchange or by desorption and thereby regenerating the resin. After a quantity of regeneration fluid sufficient to regenerate the resin has been passed through the ion exchanger, flow of regeneration fluid is terminated. Any regeneration fluid remaining in the ion exchanger can be displaced as metal ion-containing fluid is again flowed through the resin.

The regeneration fluid, pregnant with metal ions recovered from the ion exchange resin, is accumulated in a recovery fluid handling system. Employing the recovery fluid handling system, the pregnant regeneration fluid is circulated through the particulate bed electrolytic cell. The metal ions contained in the pregnant regeneration fluid are deposited in the particulate bed cell from which they are subsequently recovered. The regeneration fluid, after removal of a suitable quantity of the metal ions, is again available to regenerate the ion exchange resin.

At least one interconnection between the fluid handling systems facilitates this cyclical reuse of the regeneration fluid, first in the regeneration fluid system for ion exchanger regeneration, and subsequently in the recovery fluid handling system where these metal ions are again recovered from the regeneration fluid. Interconnection also facilitates displacement of regeneration fluid remaining in the ion exchanger following regeneration of the ion exchange resin.

The PBC may be of any suitable or conventional configuration. A typical PBC will include a chamber, an anode and a cathode current feeder positioned within the chamber, a plurality of cathode particles and a fluid distributor for introducing regeneration fluid into the chamber and for agitating the particles within the chamber. Fluid entering the chamber through the distributor agitates the particles in a circulation cycle taking them from a region intermediate the anode and the cathode current feeder to a region generally adjacent the cathode current feeder and return.

In many PBCs, a membrane selectively permeable to the metal ion being electrolytically recovered divides the PBC, separating the anode and the cathode current feeder and defining anode and cathode compartments. Where such a membrane is utilized, regeneration fluid is circulated through both compartments or through only the cathode compartment while an electrically conductive fluid circulates through the anode compartment. The particles then are present and circulate only within the cathode compartment and between a region generally adjacent the membrane and a region generally adjacent the cathode current feeder.

In a preferred embodiment of the invention, the ion exchange resin is of a cationic type or so-called acid resin. One or more hydrogen ions in the structure of the resin is exchanged with a metal ion from the fluid carrying the metal ions so that the metal ion is temporarily bound into the structure of the resin pending release during resin regeneration.

The regeneration fluid generally includes a substantial quantity of regeneration ions, usually hydrogen ions, and generally very few of the metal ions being recovered. The hydrogen ions are exchanged with the metal ions retained upon the resin, the metal ions thereby becoming dissolved in the regeneration fluid. The regeneration fluid should be electrically conductive. Electrical conductivity facilitates electrolytic recovery of metal ions from the regeneration fluid in the PBC.

The effectiveness of both the ion exchanges utilized in effecting the recovery process of the instant invention is significantly dependent upon the relative concentration of metal ions and hydrogen ions on the resin and in the fluids. Particularly, the resin accepts metal ions more readily from a fluid when relatively few metal ions are then retained on the resin structure, and the resin surrenders metal ions to the regeneration fluid more completely when the regeneration fluid contains a relatively low concentration of the metal ions being recovered. It will be seen that it is often preferable to flow regeneration fluid through the ion exchanger in a direction opposite to that in which the fluid containing metal ions flowed through the ion exchanger while the metal ions were being absorbed onto the resin. In that manner, fluid from which metal ions have been removed, exiting the ion exchanger, is exposed lastly to resin having been exposed to regeneration fluid containing relatively minimal amounts of the metal ions being recovered. That last resin presumably contains few of these metal ions, thus the exiting fluid from which metal ions have been recovered is exposed to that portion of resin within the ion exchanger most likely capable of removing the relatively few residual metal ions from the exiting fluid.

In the PBC, a voltage is impressed between the anode-cathode particulate pair via the cathode current feeder. Surface parameters of the anode-cathode pair and the electrical current generating characteristics of the source of the voltage, as well as the number and size of the cathode particles circulating within the cell, contribute to establishing a particular current density associated with operation of the PBC at a selected cell voltage. This cell voltage must be at least sufficient to cause the metal ions dissolved in the regeneration fluid to deposit upon the particles as those particles circulate within the cathode compartment. The minimally sufficient voltage will be a variable, in significant part depending upon the species of the metal ion, the nature of the electrolyte, the nature of the electrodes and the current density.

It will be seen that at the completion of each cycle wherein: (a) hydrogen ions on the ion exchange resin are replaced by metal ions as those metal ions are recovered from a fluid containing them; (b) these metal ions retained upon the ion exchange resin are exchanged for hydrogen ions supplied from the regeneration fluid; (c) the metal ions are deposited within the particulate bed electrolytic cell; and (d) regeneration fluid is displaced from the ion exchanger at the completion of each regeneration cycle, the regeneration fluid becomes progressively depleted of volume. Therefore from time to time, water and/or virgin regeneration fluid is introduced to replenish the depleted volume and any hydrogen ion loses sustained.

By this invention then, metal ions dissolved in a fluid, particularly in dilute quantities, can be removed onto ion exchange resin, leaving only relatively nominal amounts of the metal ions in the fluid. These metal ions can be then liberated from the resin into a relatively small volume of a regeneration fluid, concentrating the metal ions in the regeneration fluid to a level considerably in excess of the original fluid. Yet sufficient of the metal ions can be thereby removed from the resin to facilitate reuse of the resin in recovering further metal ions from additional metal contained fluid. Concentration of the metal ions in the regeneration fluid promotes more efficient electrolytic recovery of the metal ions from the regeneration fluid. Particularly, utilization of an electrolysis cell substantially reducing the impact of diffusion rates upon electrolysis such as a particulate bed electrolytic cell, facilitates efficient metal ion recovery from the regeneration fluid to a desired concentration level sufficiently low to enable reuse of the regeneration fluid during subsequent regenerations of the ion exchange resin.

The above and other features and advantages of the invention will become apparent from the following detailed description of the invention made with reference to the accompanying drawings which form a part of the specification.

BEST EMBODIMENT OF THE INVENTION

Figure 1:
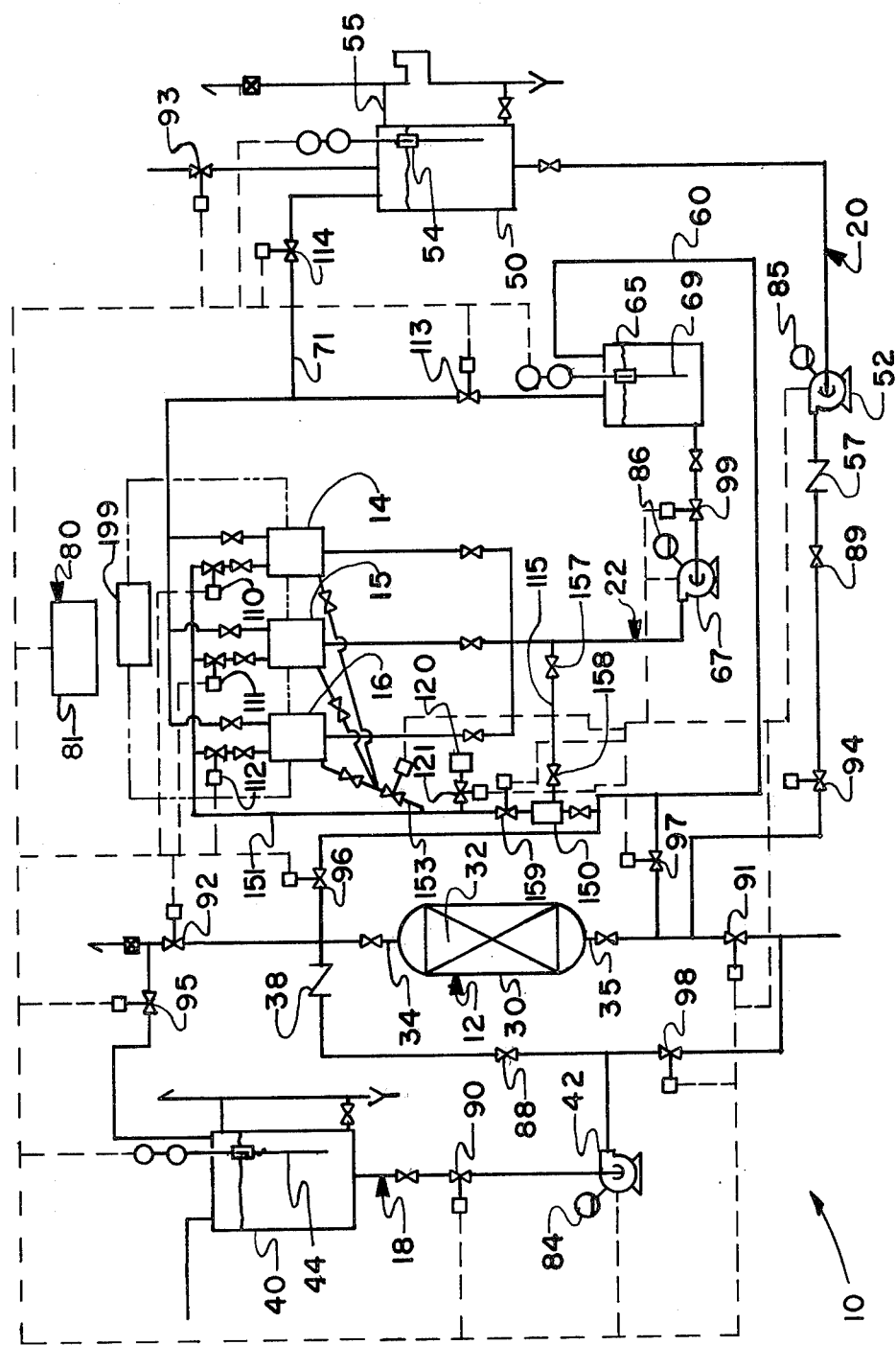
FIG. 1 is a process flow schematic for a metal ion recovery system made in acordance with the instant invention.

Referring to the drawings, FIG. 1 shows a process flow schematic for a fluid treatment system 10 made in accordance with this invention. The fluid treatment system 10 includes an ion exchanger 12 and electrolytic cells 14, 15, 16. The electrolytic cells particularly effective are those capable of reducing the impact of diffusion upon electrolysis rates. Such cells are fluidized bed electrolytic cells, forced flow mesh electrolytic cells, ECOs, and rotating cathode cells or the like. In the Best Embodiment, these cells are so-called particulate bed cells (PBC). For convenience, these cells are characterized as diffusion effect limiting.

A fluid handling system 18 is provided to collect fluid containing metal ions to be recovered and to pass the fluid through the ion exchanger 12 for recovery of the metal ions. A regeneration fluid circulation system 20 is utilized to collect a regeneration fluid, this regeneration fluid being used to recapture from the ion exchanger metal ions recovered from the metal ion-containing fluid. A recovery fluid handling system 22 is used to circulate the regeneration fluid through the PBCs 14, 15, 16 where metal ions recaptured from the ion exchanger are electrolytically recovered.

The ion exchanger is comprised of a container-like vessel 30 of a suitable or conventional type amenable to confining fluid under pump pressure. A bed 32 of ion exchange resin is confined within the vessel 30. This resin is generally of a cationic or acid type such as DUOLITE C-26, C-20, or ES-467 or the like. DUOLITE is a product of the Diamond Shamrock Corporation. The resin bed 31 constitutes a porous particulate mass partly filling the vessel 30 and through which fluid may progress relatively readily. Nozzles 34, 35 at opposite ends of the vessel 30 facilitate introduction of fluid into the ion exchange 12 and co-current fluid withdrawal.

The fluid circulation system 18 includes a tank-like reservoir 40 and a pump 42. Fluid containing ions of the metal to be recovered is collected in the reservoir 40. A level instrument 44 monitors the level of fluid within the reservoir 40. The pump 42 draws metal ion-containing fluid from the reservoir 40 and discharges the fluid via the nozzle 34 into the ion exchanger 12. The fluid passes through the ion exchanger contacting ion exchange resin contained in the resin bed 32. Metal ions contained in the fluid are removed from the fluid and retained upon the resin. The fluid exits the ion exchanger via the nozzle 35 and is thereupon available for recycle to whatever process constituted its source or for disposal. A backflow preventer 38 forstalls contamination of the metal ion-containing fluid within the reservoir 40 during subsequent recapturing of metal ions retained upon the ion exchange resin.

The fluid containing the metal ions is passed through the resin at a controlled flow rate preferably in a range generally from 0.1 to 5 gallons per minute per cubic foot of resin for typical resin bed configurations.

The ion exchange resin bed 32 generally constitutes a porous particulate mass of ion exchange resin of the cationic or acid type. The resin chemical structure includes a plurality of hydrogen ions relatively weakly bound into the resin chemical structure and consequently relatively easily removed. These hydrogen ions are relatively easily displaced by metal ions contained in the fluid contacting the ion exchange resin. The metal ions assume the approximate position in the resin structure formerly occupied by the displaced hydrogen ions while the displaced hydrogen ions replace the metal ions in the fluid. The extent to which substitution of metal ions for hydrogen ions occurs in the resin structure is significantly dependent on the relative concentrations of metal ions in the fluid and on the resin. In general, the greater the difference between the concentrations, the resin being generally of the lower concentration, the more completely are metal ions from the fluid accepted into the resin structure and thereby removed from the fluid.

The metal ions can be recaptured from the ion exchange resin by contacting the resin with a fluid containing relatively few of the metal ions and a relatively large quantity of hydrogen ions. Electrolytic recovery of metal ions recaptured from the ion exchange resin by this so-called regeneration fluid is feasible. Such recovery is enhanced where the fluid has good electrical conductance properties. An acid such as 10 percent sulfuric acid or the like is well-suited for use as a regeneration fluid where cationic or strong acid type resins are utilized to recover metal ions from a fluid containing them.

The degree to which the regeneration fluid can effect a recapture of metal ions retained upon the resin is to a significant extent governed by the relative concentration of the metal ions in the ion exchange resin and the regeneration fluid. For a very low level of metal ions to be achieved in regenerated ion exchange resin, the resin must contact regeneration fluid containing an appropriately low level of the metal ions. Conversely for metal ions to be removed to a desirably low level from a fluid containing them, as that fluid completes contact with the resin, the exiting fluid must contact a portion of the resin containing a relatively small quantity of the metal ions. It is often preferred, therefore, that regeneration fluid be passed through the ion exchanger in a direction opposite to that in which the metal ion-containing fluid has been passed such as when recovering copper. However, such opposite flow may be readily dispensed with in recovering metals such as nickel.

While focus of the recovery method in this preferred embodiment is upon recovery of metal cations upon a cationic type resin, it may be seen that metals bound in the form of an anionic complex can be equally effectively recovered utilizing the method of this invention. A fluid stream containing the anionic complex is contacted with anionic type resin in the ion exchanger 30, thereby capturing the complexed metal. The anionic complex is then removed from the resin utilizing a suitable or conventional regeneration fluid, and the metal is recovered from the regeneration fluid in a PBC as described herein.

For example, a solution containing 2–4 normal chloride ions and very low levels of cadmium or zinc can be treated to recover the zinc and cadmium by passing the solution through a resin bed filled with DUOLITE A-101D resin. A chloride anionic complex of the metal is recovered upon this anionic resin. The metal complex is subsequently recovered from the resin using water as a regeneration fluid. The metal may be recovered from the water then, using well-known electrolytic techniques.

The regeneration fluid handling system 20 including a reservoir 50 and a pump 52. The regeneration fluid accumulates in the reservoir 50. A level controller 54 monitors the fluid volume retained in the reservoir 50. In the event excess fluid accumulates, an overflow drain 55 is provided to dispose of the excess.

During regeneration of the ion exchange resin, the regeneration fluid is transferred utilizing the pump 52 through the nozzle 35 into the vessel 30. Under pump impetus, a volume of the regeneration fluid considerably smaller than the volume of fluid from which metal ions were removed onto the resin is passed through the porous particulate resin bed 32 exiting the ion exchanger via the nozzle 34. Flow rate of the regeneration fluid through the resin bed is generally 5 percent to 50 percent of the flow of metal ion-containing fluid therethrough. A backflow preventer 57 is provided to forestall possible flow of metal ion-containing fluid through the pump 52 while that fluid is being processed in the ion exchanger 12. Regeneration fluid exiting the ion exchanger is pregnant with metal ions recaptured from the resin. The pregnant fluid is transferred utilizing an interconnection 60 to the recovery fluid handling system 22.

A reservoir 65 and a pump 67 are included in the recovery fluid handling system 22. Regeneration fluid pregnant with the recaptured metal ions is accumulated in the reservoir 65 and circulated utilizing the pump 67 through the particulate bed electrolyic cells 14, 15, 16. An electrical voltage is impressed upon the cells 14, 15, 16 and metal ions dissolved in the pregnant regeneration fluid deposit in the cells under the impetus of an electrical current induced by the electrical voltage. Regeneration fluid leaving the particulate bed electrolytic cell following treatment is returned to the reservoir 65.

A level detector 69 on the reservoir 65 provides an indication of regeneration fluid accumulating in the recovery fluid handling system 22. As a sufficient regeneration fluid volume accumulates and is reduced in metal ion concentration to a level generally of 50 parts per million or less by treatment in the particulate bed electrolytic cells, a flow of treated regeneration fluid is returned to the reservoir 50 of the regeneration fluid handling system. An interconnection 71 facilitates returning this treated regeneration fluid to reservoir 50 from which it may be utilized to effect a further resin regeneration.

Operation of the fluid treatment system 10 is monitored and controlled utilizing a control system 80 housed in a suitable or conventional cabinet 81 or enclosure. The control system 80 acts through suitable or conventional control devices such as solenoid valves and pump automatic starting stations 84, 85, 86, to regulate the flow of fluids during the treatment process.

Metal ion-containing fluid is caused to flow through the ion exchanger for metal ion recovery when the control system causes solenoid valves 90, 91 to open and start pump 42.

During flow of metal ion-containing fluid through the ion exchanger 12, the flow rate of the fluid may be controlled utilizing a suitable or conventional flow control device 88. After a desired quantity of the metal ion-containing fluid from the reservoir 40 has been contacted with the ion exchange resin bed 32, the control system 80 stops pump 42 and closes solenoid 90. Fluid remaining in the resin bed 32 can be drained from ion exchanger 12 after which solenoid 91 is also closed. Opening of solenoid 92 facilitates this draining.

After recovering metal ions from the fluid, the ion exchange resin bed 32 is regenerated. Regeneration is initiated by partially filling the reservoir 50 with a regeneration fluid such as 10 percent $H_2SO_4$. As a preferred alternate to draining the metal ion-containing fluid described above, the fluid remaining in the exchanger 30 may be displaced back to the reservoir 40. For displacement, the control system opens solenoid 93 to supply fresh $H_2SO_4$ as required. Then the pump 52 is started using the remote starter 85 and solenoids 92, 94, 95 are opened to permit regeneration fluid flow through the resin bed 32 and displace the ion-containing fluid to the reservoir 40. After sufficient fluid is displaced, solenoid valve 95 is closed and solenoid valve 96 is opened to conduct regeneration fluid to the reservoir 65. The fluid control device 89 may be used to regulate fluid flow through the resin bed 32 to achieve advantageous regeneration conditions. In addition, it may be advantageous to permit solenoid valve 92 to remain open throughout regeneration fluid flow through the ion exchanger 12.

Following completion of the regeneration, solenoid valves 94 and 96 are closed. By opening solenoid valves 92 and 97, regeneration fluid remaining in the ion exchanger 12 after regeneration may be drained to the reservoir 65. Preferably, solenoid valves 90 and 97 may be opened, the pump 42 started and metal ion-containing fluid pumped through the ion exchanger 12 to displace remaining regeneration fluid into the reservoir 65. Following this displacement, the solenoid valve 97 is closed and the solenoid valve 91 opened to facilitate further metal ion recovery from fluid in the reservoir 40.

In the event that, while the ion exchange resin bed 32 is being regenerated, excess metal ion-containing fluid accumulates in the reservoir 40, the excess fluid may be disposed of either by overflowing the reservoir or by opening solenoids 90 and 98 and starting pump 42 to bypass the ion-exchanger 12 with the fluid.

Regeneration fluid pregnant with metal ions is caused to circulate through the particulate bed cells 14, 15, 16 when solenoid valves 99 and 113 are opened and the pump 67 is started via the remote starter 86. Some of the regeneration fluid returns immediately to the reservoir 65 from which it is again circulated through the cells. Depending upon the volume of regeneration fluid in the recovery fluid handling system 22, and the concentration of metal ions in that regeneration fluid, a portion of the returning regeneration fluid is caused to flow through the solenoid valve 114 into the reservoir 50 to be again utilized in another ion exchange resin regeneration.

Seed particles for the cells 14, 15, 16 are introduced into the cells by placing them in a suitable or conventional feeding device 120. A solenoid valve 121 is caused to open periodically by the control system 80, admitting the seed particles into the cells. A slip stream 115 of regeneration fluid being circulated through the cells is utilized to convey the particles into the cell.

As metal ions under the influence of the electrical potential impressed on the cells deposit on the particles circulating in the cell, the particles grow. As they grow, it is desirable to remove those larger particles. Removal is accomplished in a particle separator-collector 150 of any suitable or conventional type. A stream 153 from the cells is subjected to particle separation. Particles to be separated and some of the regeneration fluid being circulated through the cells join the slip stream 115. The combined streams 153 and 115 flow upwardly at a precisely determined flow rate, accomplished in any suitable or conventional manner such as by utilizing a flow controller 157, chosen such that the action of gravity on particles of a desired weight or size will not be offset by the force of upwardly moving fluid. The desired particles sink to the separator-collector 150. Lighter, smaller particles remain with the upwardly moving fluid stream and return via solenoid valves 110, 111, 112 to the cells 14, 15, 16. The larger particles are periodically withdrawn from the separator-collector 150 for further processing. Generally, particles circulating in the cell are maintained between 400 and 2500 microns.

Solenoid valves 158, 159 control flow of the slip stream 115 through the separator-collector 150 while the solenoid 110, 111, 112 are utilized to determine into which cell 14, 15, 16 the separated particles are returned.

Figure 2:
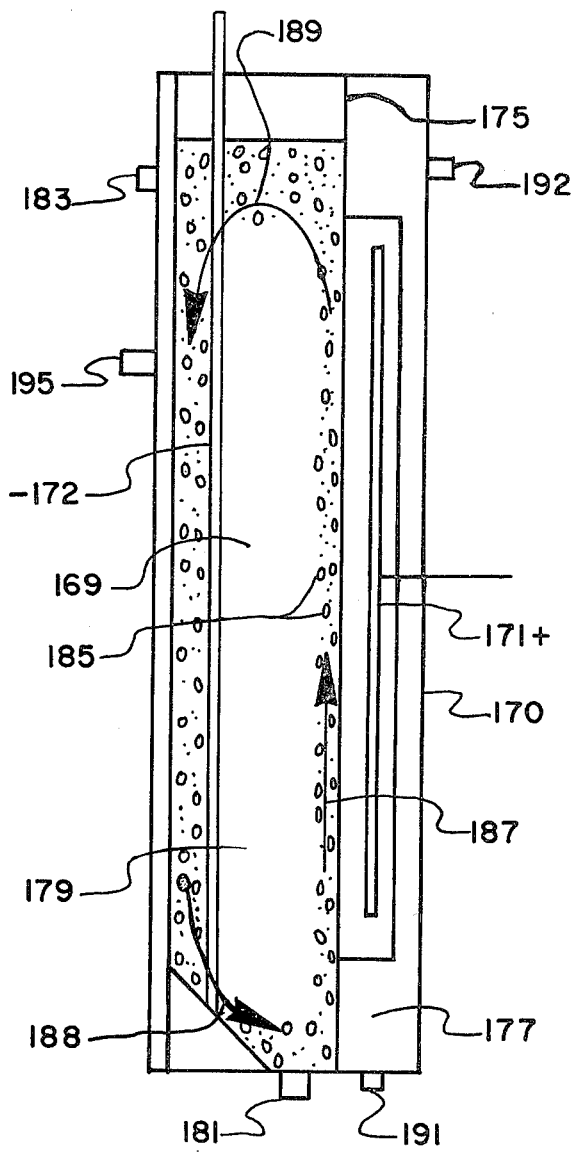
FIG. 2 is a cutaway side elevational view of a particulate bed electrolytic cell adapted for use in conjunction with the instant invention.

A typical particulate bed electrolytic cell 14, 15, 16 is shown in FIG. 2. The cell is comprised of chamber 169 defined by a housing 170. An anode 171 and a cathode current feeder 172 are supportably arranged in the housing 170. A membrane 175 separates the anode 171 and the cathode current feeder 172.

The housing 170 is of a suitable or conventional type for confining the regeneration fluid under pump discharge pressure. The membrane 175 divides the chamber 169 defined by the housing into an anode compartment 177 and a cathode compartment 179 containing respectively the anode 171 and cathode current feeder 172.

A fluid entry nozzle 181 and a fluid exit nozzle 183 are provided on the housing. Regeneration fluid being circulated through the cell 14 enters the cathode compartment via the nozzle 181 and exits via the nozzel 183. While in the cathode compartment 179, the regeneration fluid contacts the particles 185 causing them to circulate within the cathode compartment 179 in a direction generally indicated by arrows 187, 188, 189.

A narrowing portion of the housing 170 intensifies and to a greater or lesser extent shapes flow of the regeneration fluid entering the cell 14 via the nozzle 181. This shaped flow lifts particles 185 near the bottom of the cathode compartment into the particle circulation pattern. The particles 185, in periodic contact with the cathode current feeder 172 as they circulate, acquire a charge, making the particles attractive to the metal ions contained in the pregnant regeneration fluid flowing through the cell. The metal ions deposit or plate upon the particles 185 removing the ions from the regeneration fluid.

An anolyte is circulated through the anode compartment 171, entering via a nozzle 191 and exiting via a nozzle 192. The anolyte is preferably a good electrical conductor and is generally a fluid of a composition similar to the regeneration fluid, for example, 10 percent $H_2SO_4$. Generally, the anolyte circulates separately from the regeneration fluid to facilitate removal of oxygen evolved at the cell anode during the electrolytic process. Where regeneration fluid pregnant with metal ions is utilized as the anolyte, it should be treated to remove oxygen before being recombined with regeneration fluid having flowed through the cathode compartment.

The membrane dividing the chamber may be of any suitable or conventional type. Where regeneration fluid is utilized as the anolyte, the membrane preferably is permeable to the metal ions. The membrane should be resistant to the migration of anions from the cathode compartment to the anode compartment.

Where the anolyte circulates separately from the regeneration fluid, it can be supplied in any suitable or conventional manner well-known in the art and, therefore, not described in detail herein.

Particles 185 are withdrawn for separation to a separator-collector 150 in any suitable or conventional manner such as through a nozzle 195. Particles 185, together with regeneration fluid, departing the cell 14 via nozzle 195 constitute the stream 153. Following separation, the particles, any and new particles added through the feeder 120, and regeneration fluid comprising the combined streams 153 and 115 re-enter the cell 14 in any suitable or conventional manner such as via nozzle 181.

A portion of the metal ions depositing in the cell 14 may deposit directly upon the cathode current feeder 172. It is preferable, therefore, that the cathode current feeder 172 be relatively readily removable facilitating changeouts as metal deposits upon the cathodes.

Electrical current to operate the cells 14, 15, 16 is supplied in any suitable or conventional manner such as from a rectifier 199.

The method and apparatus of this invention is intended for recovery of metal cations or metals comprising a portion of an anionic metal complex where the metal is electrowinnable. Particularly the method and apparatus has been found advantageous for recovering metals belonging to Periodic Table Groups 8, 1B, 2B, 4A and 5A.

Especially the method has been found effective in recovering cobalt, nickel, zinc, cadmium, lead and copper. However, the method and apparatus are equally applicable to recovery of gold, silver, platinum, osmium, ruthenium, rhodium, irridium, palladium, iron, tin and antimony as well as other electrowinnable metals.

The following examples are offered to further illustrate the features and advantages of the invention.

EXAMPLE I

A 2.5 centimeter diameter (i.d.) vertically mounted ion exchange column was charged with 100 milliliters of DUOLITE C-20 resin in the sodium form. The resin occupied the ion exchange column to a depth of about 20 centimeters. After conversion of the resin to the hydrogen form, an aqueous solution of 600 parts per million (ppm) copper ($Cu^{++}$) at a pH of 2.5 was flowed in downflow configuration through the column to load the resin. Loading required approximately 9 liters of copper solution.

The column was then regenerated with approximately 8 to 10 bed volume of 50 g/l $H_2SO_4$ flowed through the column in upflow configuration. Initially during regeneration fluid exiting the column (approximately 30 milliliters) was returned to a reservoir containing the copper containing feed solution, the initial flow being feed solution remaining in the column. As elevated copper levels appeared in regeneration fluid exiting the column, the regeneration fluid was collected for electrolysis. The 8 to 10 bed volumes, collected for electrolysis contained 4 to 5 grams per liter copper; the sulfuric acid content had been reduced to approximatly 35 grams per liter. Regeneration fluid remaining in the column was displaced and collected for electrolysis at the commencement of recovery of copper from additional copper containing solution. The cycles of absorption and desorption are repeated to collect sufficient fluid for electrolysis.

Approximately 9 liters of regeneration fluid collected for electrolysis was circulated through a particle bed cell similar to one shown and described in the best embodiment of the invention. The cell included a 0.02 meter$^2$ anode and a power supply capable of delivering 20 amps. Within 3 hours, the recirculation fluid had been reduced to less than 10 ppm copper while sulfuric strength of the regeneration fluid had returned to 50 grams per liter. Approximately 45 grams of copper was recovered in the cell. DUOLITE C-26 resin performs comparably.

EXAMPLE II

A 1.8 centimeter diameter (i.d.) vertically mounted ion exchange column was charged with 50 milliliters of DUOLITE C-20 ion exchange resin in the hydrogen form. The resin occupied the column to a depth of approximately 20 centimeters. The resin was loaded with nickel from a solution containing 0.35 gram per liter nickel as $NiCl_2 \cdot 6H_2O$ and 0.65 gram per liter nickel as $NiSO_4$ flowed in downflow configuration through the column at a rate of 10 bed volumes per hour. The loading solution had been adjusted to a pH of 3.8 with $H_2SO_4$. Resin loading was accompanied by a color change to dark green and was completed in 5 hours. The column was regenerated by flowing a solution of 70 grams per liter $Na_2SO_4$ through the column in downflow configuration at a rate of 5 bed volumes per hour. Regeneration fluid exiting the column was collected for electrolysis, and after one hour, the collected regeneration fluid contained 10 grams per liter Ni.

Repeated cycles of Ni recovery from solution and subsequent resin regeneration were conducted. Regeneration fluid remaining in the column at the start of each cycle was displaced by the $NiCl_2/NiSO_4$ solution entering the column and collected for electrolysis.

Approximately 9 liters of the regeneration fluid collected for electrolysis was circulated through the particulate bed cell described in Example I and electrolyzed for 6 hours at 20 amps after which a 100 ppm Ni residual remained in the regeneration fluid. NaOH and $H_2SO_4$ were added to the regeneration fluid undergoing electrolysis to maintain a pH of 3 to 4. Approximately 80 grams of Ni were recovered.

EXAMPLE III

Where cadmium is to be recovered, the ion exchange columns of either of Examples I or II are charged with DUOLITE C-20 resin in hydrogen form. A dilute, e.g., less than one gram per liter sulfate solution of cadmium, is flowed in downflow configuration through the column until the resin becomes loaded with cadmium ions. The column is regenerated by flowing 70 grams per liter $H_2SO_4$ through the column in downflow configuration. Regeneration fluid exiting the column is collected and found to contain approximately 5 to 7 grams per liter cadmium. The collected regeneration fluid is electrolyzed in the particle bed cell of Example I at 20 amps. In excess of 95 percent of the cadmium present in the dilute cadmium solution flowed through the ion exchange column is thereby recovered during electrolysis.

EXAMPLE IV

Where cobalt is to be recovered, the ion exchange column of either of Examples I or II is charged with DUOLITE C-20 resin in the manner described in Examples I and II. A solution of one gram per liter cobalt chloride in aqueous sodium chloride is flowed in downflow configuration through the ion exchange resin to load the resin. The resin is then regenerated by flowing a solution of 70 grams per liter $Na_2SO_4$ and 2.5 grams per liter $H_2SO_4$ through the ion exchanger in downflow configuration. Regeneration fluid exiting the ion exchanger is collected; and at the completion of a regeneration cycle, the collected fluid is found to contain between 5 and 7 grams per liter cobalt. After several cycles of removing cobalt from the dilute cobalt containing solution and subsequent regeneration of the ion exchange resin, the collected regeneration fluid is electrolyzed in the particulate bed cell of Example I. The regeneration fluid is maintained at a pH of between 3 and 4 by the appropriate addition of $H_2SO_4$ and NaOH. In excess of 95 percent of the cobalt percent in the dilute cobalt solution fed to the ion exchange column is thereby recovered.

EXAMPLE V

Where zinc is to be recovered, the ion exchange column of either Example I or II is charged with DUOLITE C-20 resin. A dilute (less than one gram per liter) zinc chloride solution is flowed through the ion exchange column in downflow configuration at a flow rate of about 60 milliliters per minute. Following saturation of the resin with zinc ions, the resin is regenerated with 1-N hydrochloric acid. Regeneration fluid exiting the ion exchange column is collected for electrolysis. Electrolysis is conducted in the particulate bed cell of Example I and in excess of 95 percent of the zinc present in the dilute zinc chloride solution fed to the ion exchanger is thereby recovered.

It should be readily apparent that various modifications can be accomplished to the embodiment as shown and described. For example, a plurality of ion exchangers can be utilized so that one or more exchangers are recovering metal ions while others are being regenerated. A system for controlling such a process would be accordingly more complex.

Therefore, while a preferred embodiment of the invention has been described in detail, it will be apparent that various modifications or alterations may be made therein without departing from the spirit and scope of the invention as set forth in the appended claims.

What is claimed is:

1. Apparatus for concentration and recovery of metal ions present in a fluid in a relatively low concentration comprising:
    a container including a porous particulate mass of ion exchange resin;
    fluid handling means for transferring a relatively large quantity of the fluid through the container, for controlling the flow of the fluid through the container, for providing fluid storage capacity and for removing fluid remaining in the container following a transfer;
    a quantity of a regeneration fluid;
    an electrolytic cell including: particles circulating between a cathode current feeder and a point at least intermediate the cathode current feeder and an anode, and a fluid distribution means arranged whereby fluid passing the fluid distribution means promotes particle movement within the particulate bed electrolytic cell;
    regeneration fluid handling means for passing the regeneration fluid through the ion exchange container and for containing a working quantity of the regeneration fluid;
    recovery fluid handling means for circulating the regeneration fluid through the fluid distribution means and for containing a working quantity of the regeneration fluid; and
    at least one fluid interconnection between the regeneration fluid handling means and the recovery fluid handling means for transferring regeneration fluid therebetween.

2. Apparatus for concentration and recovery of metal ions present in a fluid in a relatively low concentration comprising:
    an ion exchange column;
    a cationic type ion exchange resin contained in the column as a porous particulate mass;
    fluid handling means for collecting the metal ion containing fluid and for controllably passing a relatively large quantity of the fluid through the ion exchange column at a rate of between 0.1 and 5 gallons per minute per cubic foot of resin whereby the metal ions are removed from the fluid and removeably retained upon the ion exchange resin;
    a quantity of a proton donating regeneration fluid;
    a particulate bed electrolytic cell including:
    (i) a chamber
    (ii) a cathode-anode pair
    (iii) a plurality of particles in a size range of between 400 and 2500 microns contained within the cathode compartment and comprising the cathode
    (iv) a cation permeable membrane separating the pair in a fluid tight relationship thereby defining anode and cathode compartments
    (v) a controllable electrical current source for establishing a voltage between the pair
    (vi) a liquid distribution means for distributing a circulated fluid within at least the cathode compartment and for agitating the particles within the cathode compartment;
    regeneration fluid handling means for accumulating regeneration fluid and for passing the regeneration fluid through the ion exchanger;
    recovery fluid handling means for accumulating a desired volume of the regeneration fluid and for circulating the regeneration fluid through the particulate bed electrolytic cell including the fluid distribution means; and
    at least one fluid interconnection between the regeneration fluid handling means and the recovery fluid handling means for transferring regeneration fluid therebetween.

* * * * *